United States Patent [19]

Hamer

[11] Patent Number: 4,620,956

[45] Date of Patent: Nov. 4, 1986

[54] PROCESS FOR PREPARING MICROPOROUS POLYETHYLENE FILM BY UNIAXIAL COLD AND HOT STRETCHING

[75] Inventor: Edward A. G. Hamer, Metuchen, N.J.

[73] Assignee: Celanese Corporation, New York, N.Y.

[21] Appl. No.: 756,527

[22] Filed: Jul. 19, 1985

[51] Int. Cl.⁴ .............................................. B28B 11/16
[52] U.S. Cl. ................................. 264/145; 264/210.7; 264/235.6; 264/288.8
[58] Field of Search ........... 264/288.8, 235.6, 342 RE, 264/41, 1.3, DIG. 17, 145, 210.7

[56] References Cited

U.S. PATENT DOCUMENTS

| | | | |
|---|---|---|---|
| 3,679,538 | 7/1972 | Druin et al. | 264/DIG. 13 |
| 3,801,692 | 4/1974 | Zimmerman | 264/288.8 |
| 3,843,761 | 10/1974 | Bierenbaum et al. | 264/210 R |
| 4,138,459 | 2/1979 | Brazinsky et al. | 264/154 |

Primary Examiner—Donald Czaja
Assistant Examiner—Jennifer E. Cabaniss
Attorney, Agent, or Firm—Bryan H. Davidson

[57] ABSTRACT

An improved process for the production of a microporous polyethylene film by cold stretching and hot stretching a non-porous crystalline, elastic polyethylene film, whereby the permeability of the resultant film is improved by controlling both the stretching rates during cold and hot stretching and the sum of the changes in length during each stretching step.

18 Claims, 5 Drawing Figures

PROCESS FOR PREPARING MICROPOROUS POLYETHYLENE FILM BY UNIAXIAL COLD AND HOT STRETCHING

BACKGROUND OF THE INVENTION

1. Field of the Invention

The present invention relates to a novel process for producing open-celled microporous films from high density polyethylene homopolymer resins by mechanical means, and to the films produced thereby.

Porous or cellular films can be classified into two general types: one type in which the pores are not interconnected, i.e., a closed-cell film, and the other type in which the pores are essentially interconnected through tortuous paths which may extend from one exterior surface or surface region to another, i.e., an open-celled film. The porous films of the present invention are of the latter type.

The microporous films of the present invention are characterized by having high film permeabilities. Film "permeability" is a measure of the ease with which a fluid can pass from one exterior surface of a microporous film to another exterior surface. The number of pores, the size of the pores, the degree of pore interconnection and the thickness of a microporous film are among the factors upon which the present invention operates and that influence the permeability of the film. Such permeabilities can be expressed in terms of Gurley seconds, which is the time required for 10 cm.$^3$ of air to pass through 1 in.$^2$ of film from one exterior surface to the other when a pressure differential of 12.2 in. of water is applied across the film. Since permeability is a measure of the ease of mass transfer across the film, lower Gurley second values correspond to lower mass transfer times and hence to higher permeabilities and a greater ease of mass transfer.

2. Background of the Invention

Heretofore, films have been prepared from synthetic resins or polymers, e.g., polypropylene and polyethylene, by various melt extrusion or casting methods. Such films have many desirable properties such as high strength and resistance to heat, light, and various chemicals.

For specific applications such as filter media and battery separators, films having a porous structure in addition to their other properties are necessary or highly desirable.

Porous films have been produced which possess a microporous, open-celled structure. Such films are described, for example, in U.S. Pat. No. 3,426,754, which patent is assigned to the assignee of the present invention. The preferred method of preparation described therein involves drawing or stretching at ambient temperatures, i.e., "cold drawing", a crystalline, elastic starting film in an amount of about 10 to 300 percent of its original length, with subsequent stabilization by heat setting of the drawn film under tension such that the film is not free to shrink or can shrink only to a limited extent. Other processes for producing microporous films involve both "cold" stretching and "hot" stretching steps. For example, U.S. Pat. No. 3,843,761, which patent is also assigned to the assignee of the present invention, describes a process involving annealing, cold stretching, and subsequent multiple hot stretching steps for rendering various polymeric films microporous. In another method, U.S. Pat. No. 4,138,459, for example, also assigned to the assignee of the present invention, describes rendering various polymeric films microporous by a process involving annealing, cold stretching, hot stretching, and heat relaxing steps.

Heretofore there has been no recognition in the art of the factors and variables that affect and effect the permeabilities of the microporous films produced, and, in particular, there has been no such recognition with respect to polyethylene microporous films.

SUMMARY OF THE INVENTION

Accordingly, an object of the present invention is to provide a process for producing microporous polyethylene films which have improved permeabilities.

Another object of the present invention is to produce open-celled microporous polyethylene films which have controlled and predetermined permeabilities.

It is also an object of the present invention to produce highly permeable polyethylene films with superior dimensional stability.

Another object of the present invention is to produce microporous polyethylene films which can be sterilized by irradiation.

These and other objects, as well as the scope, nature, and utilization of the claimed invention will be apparent to those skilled in the art from the following detailed description and appended claims.

The instant invention is directed to an improved process for the preparation of microporous films. The process of the instant invention provides microporous polyethylene films having superior permeabilities as compared to microporous polyethylene films of the prior art as well as having dimensional stability.

In accordance with the instant invention, an improved process is provided for the preparation of an open-celled microporous polyethylene homopolymer film. In one embodiment of this process a polyethylene resin having a density of at least approximately 0.960 gm./cm.$^3$ and having at least 99% by weight ethylene is melt extruded at a drawdown ratio of about 20:1 to about 200:1 to form an extruded precursor film having a thickness of between about 0.2 mil and about 2.0 mil; the extruded precursor film is annealed at a temperature in the range of from about 10° C. to about 25° C. less than the crystalline melting point of the resin to form an unstretched annealed precursor film; the annealed precursor film is uniaxially cold stretched at a temperature in the range of from about −20° C. to about 70° C., and at a cold stretching rate of at least 75 percent per minute, based on the length of the unstretched annealed precursor film, to achieve a cold stretched length of about 120 percent to 160 percent, the cold stretched length being based on the length of the unstretched annealed precursor film, to form a cold stretched precursor film; and the cold stretched precursor film is hot stretched, in the same uniaxial direction as the cold stretching, at a temperature in the range of from above the temperature of the cold stretching to less than or equal to the annealing temperature, at a hot stretching rate of less than 75 percent per minute, based on the length of the unstretched annealed precursor film, to achieve a final hot stretched length of about 235 percent to about 310 percent, the hot stretched length being based on the length of the unstretched annealed precursor film, so as to form a microporous polyethylene film.

In a second embodiment of the process of the instant invention, a polyethylene homopolymer resin having a density of at least approximately 0.960 gm./cm.$^3$ and having at least 99% by weight ethylene is melt extruded at a drawdown ratio of about 20:1 to about 200:1 to form an extruded precursor film having a thickness of between about 0.2 mil and about 2.0 mil the extruded precursor film is annealed at a temperature in the range of from about 10° C. to about 25° C. less than the crystalline melting point of the resin to form an unstretched annealed precursor film; the annealed precursor film is uniaxially cold stretched at a temperature in the range of from about −20° C. to about 70° C. at a cold stretching rate of between about 380 percent per minute and about 440 percent per minute based on the length of the annealed precursor film, to achieve a cold stretched length of between about 190 percent and 200 percent, the cold stretched length being based on the length of the annealed precursor film, to form a cold stretched precursor film; the cold stretched precursor film is hot stretched, in the same uniaxial direction as the cold stretching, at a temperature in the range of from above the temperature of the cold stretching to less than or equal to the annealing temperature at a hot stretching rate of about 105 percent per minute, based on the length of the annealed precursor film, to achieve a hot stretched length of about 240 percent, the hot stretched length also being based on the length of the annealed precursor film, to form a hot stretched precursor film; and the hot stretched precursor film is heat relaxed under tension at a temperature in the range of from above the temperature of the cold stretching to less than or equal to the annealing temperature to achieve a decrease in length, in the same uniaxial direction as the cold stretching, of between 0 percent and about 30 percent, the decrease in length being based on the annealed precursor film, so as to form a microporous polyethylene film.

DESCRIPTION OF THE PREFERRED EMBODIMENTS

Figure 1:
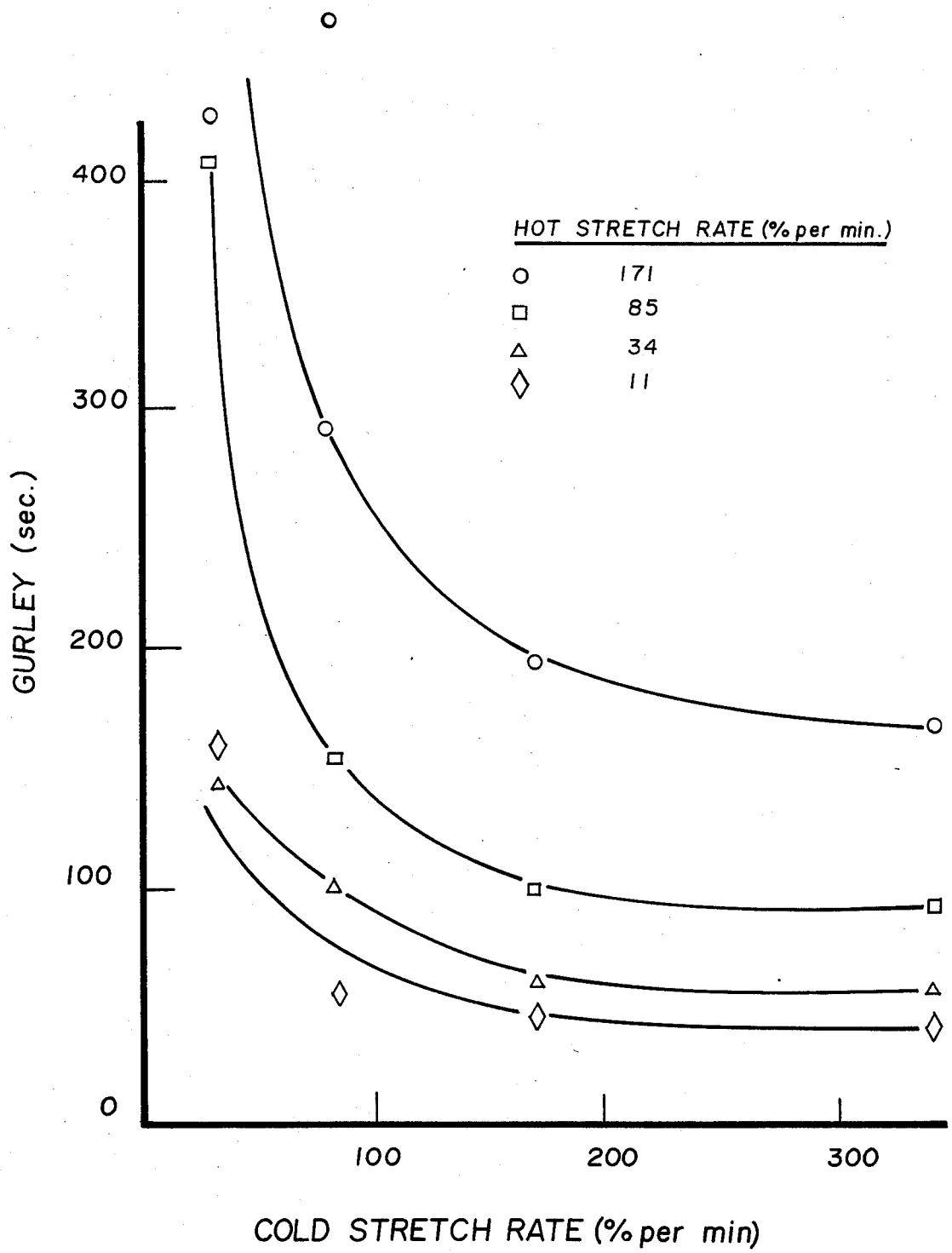
FIGS. 1, 2, 3, and 4 are graphic depictions of the effect of the instant invention on film permeability for each of four total extensions, respectively.
Figure 2:
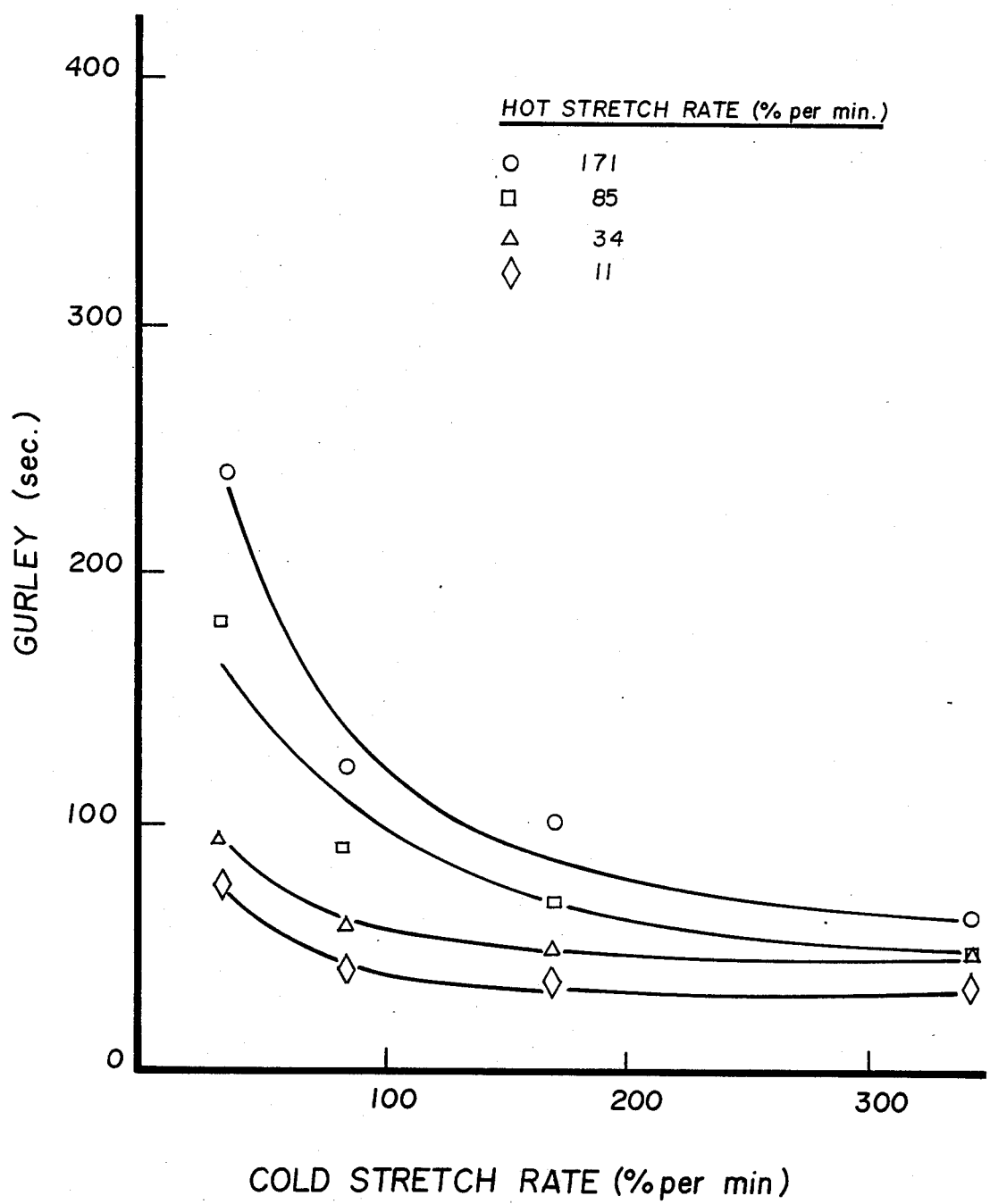
Figure 3:
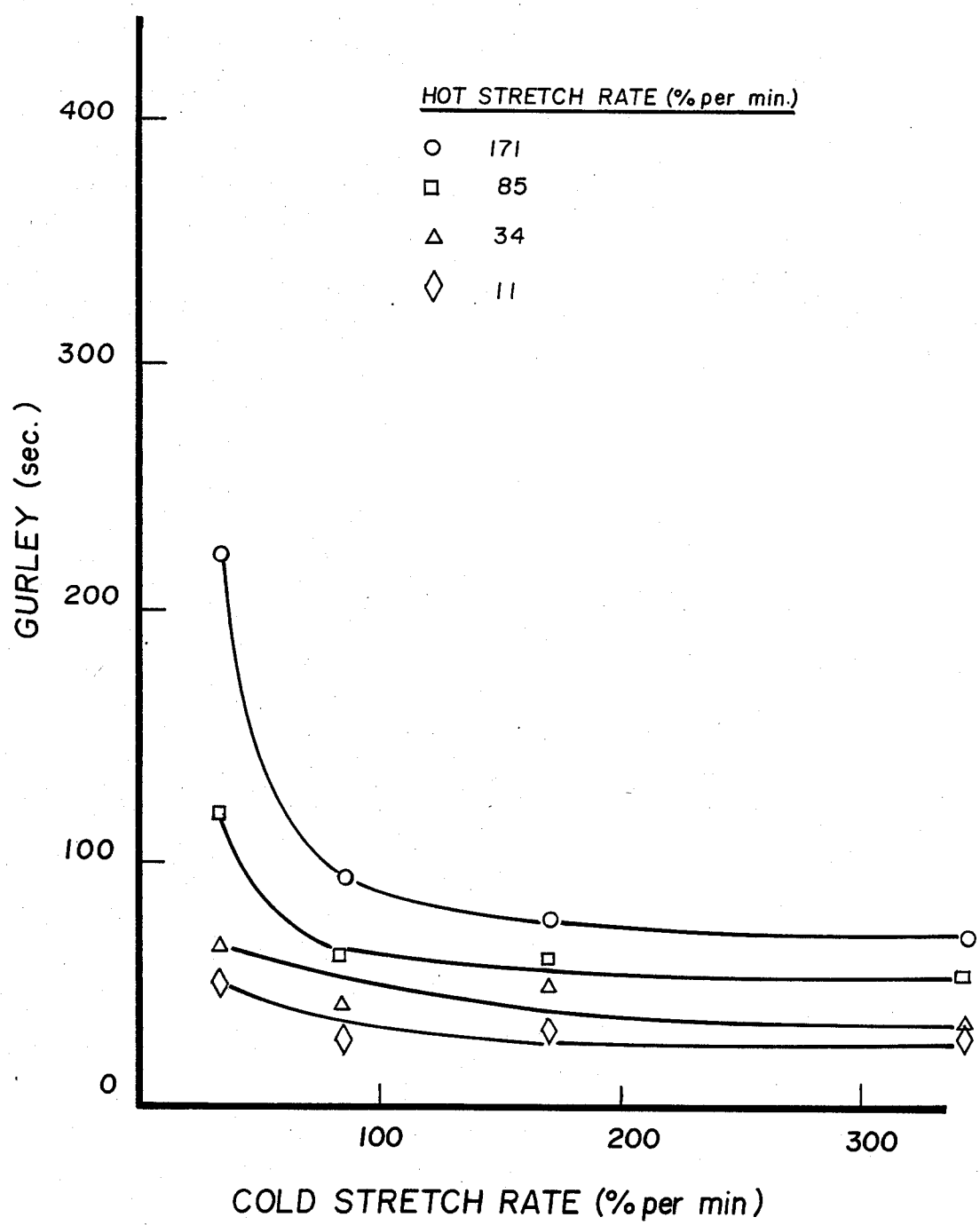
Figure 4:
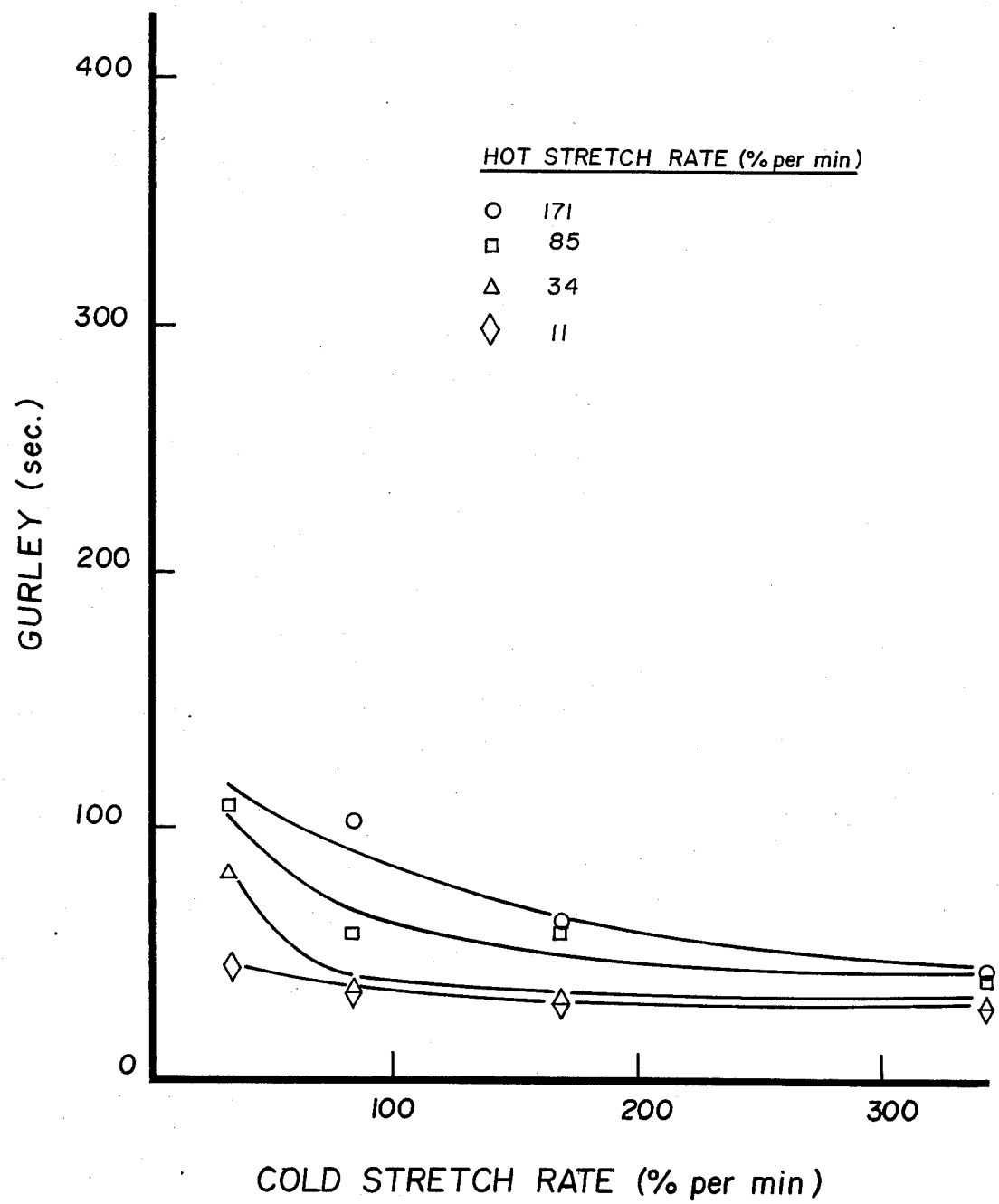

The process of the instant invention relates to the preparation of microporous polyethylene films having improved permeabilities after mechanical stretching. As heretofore noted, Gurley values are a measure of permeability, and the process of the instant invention produces microporous polyethylene films having Gurley value permeabilities below 20 seconds.

The polymer employed in the instant invention is necessarily polyethylene, preferably a high density polyethylene, and most preferably a polyethylene having a density of at least 0.960 gm./cm.$^3$ (ASTM D1248-81a, Type IV), as these polymers yield films with the highest permeabilities. By "high density polyethylene" is meant a substantially linear homopolymer of ethylene containing at least 99% by weight of ethylene. The polyethylenes employed in the instant invention have an inherent viscosity (ASTM D1601-78) ranging from about 2.3 to about 1.4, preferably from about 2.1 to about 1.9, a melt flow rate in units of grams per 10 minutes (ASTM D1238-79, Condition E) of from about 0.2 to about 5.0, preferably from about 0.5 to about 1.0, and a crystalline melting point of about 135° C., to produce a final film product having the requisite permeability.

The films prepared by the instant invention preferably comprise at least about 99 weight percent polyethylene.

The films of the present invention may also contain amounts of inert pigments (e.g. titanium dioxide) or other materials which do not detract from the present invention.

The types of apparatus suitable for forming the extruded precursor films of this invention are well known in the art. For example, a conventional film extruder equipped with a shallow channel metering screw and coat hanger die is satisfactory. Generally, the resin is introduced into a hopper of the extruder which contains a screw and a jacket fitted with heating elements. The resin is melted and transferred by the screw to the die from which it is extruded through a slot in the form of a film, which is drawn by a take-up or casting roll.

While the above description is directed to slit die extrusion methods, an alternative and preferred method of forming the starting elastic films contemplated by this invention is the blown film extrusion method, wherein a hopper and an extruder are employed which are substantially the same as in the slot extruder described above. From the extruder, the melt enters a die from which it is extruded through a circular slot to form a tubular film having an initial diameter $D_1$. The melt is extruded at a temperature in the range from about 160° C. to about 240° C., and preferably in the vicinity of about 200° C. However, significantly different temperatures may be required when polyethylenes of very low or very high molecular weights are employed in the present invention. Using this blown film extrusion method, the drawdown ratio is preferably 20:1 to 200:1. The term "drawdown ratio" as used herein is defined as the ratio of the die gap to the film thickness.

Air enters the system through an inlet into the interior of the tubular film, and has the effect of expanding or blowing-up the diameter of the tubular film to a diameter $D_2$. Rapid cooling of the melt is preferably carried out to obtain maximum elasticity of the film. Means such as air rings positioned close to the extrusion die may be provided for directing air about the exterior of the extruded tubular film to provide quick and effective cooling.

The extruded precursor film is then annealed to improve its crystal structure, such as by increasing the size of the crystallites and removing imperfections therein. Generally, the annealing is carried out as the film is transported under tension through an oven, and at a temperature of about 10° C. to about 25° C. less than the crystalline melting point of the polymer, and preferably at a temperature of about 15° C. to 20° C. less than the crystalline melting point of the polymer. The period during which annealing occurs is in the range of from about 30 seconds to about 1 hour. The preferred period for annealing in each of the embodiments described hereinafter is about 20 minutes, at which time the beneficial effect of the annealing on the microporosity development during stretching of the film is essentially, fully realized. Without this annealing, subsequent stretching of the extruded film yields films of reduced porosity and permeability.

It is of primary concern during the annealing (and the subsequent hot stretching) that the crystalline structure of the extruded film be maintained. The crystalline melting point of a resin is a recognized property and is often the primary criterion for establishing a maximum annealing temperature. However, the crystalline melting point is not as accurate a criterion for determining the maximum annealing temperature as is the incipient softening point; destruction rather than perfection of the crystalline structure occurs if the incipient softening point is exceeded. The incipient softening point for polyethylene homopolymers is 10° C. to 15° C. lower than the crystalline melting point, i.e. about 120° C. Although the "softening point" as defined herein is not generally published, it is necessarily of interest in practicing the present invention. Hence, annealing is preferably at the highest possible temperature below the incipient softening point.

The elastic, partly-crystalline, non-porous, annealed precursor film is stretched to produce a microporous film. In the process of the present invention, the unstretched annealed precursor film is initially stretched in a cold stretching zone. Preferably, the cold stretching step comprises stretching the non-porous film between two rollers, wherein the second or downstream roller rotates at a greater peripheral speed than the first or upstream roller. Such a procedure can be accomplished by providing two rollers of approximately the same size wherein the second, downstream roller is rotated at a faster rotational speed than the upstream roller. Alternatively, the two rollers can be rotated at the same speed with the downstream roller being of greater diameter than the upstream roller. In both cases, the downstream roller imparts a greater linear velocity to the film than does the adjacent upstream roller. Such a procedure results in the preferred uniaxial longitudinal stretching of the film, so as to form a cold stretched precursor film. By "cold stretching" is meant stretching the film at a temperature in the range of between about −20° C. and a temperature of about 70° C., and preferably at ambient temperature.

The cold stretched precursor film is thereafter hot stretched in the same uniaxial direction as the cold stretching so as to produce a microporous film. Thus, the film retains its uniaxial stretching configuration. In accordance with this invention, the hot stretching occurs at a temperature in the range from above the temperature of the cold stretching to a temperature less than or equal to the annealing temperature. The hot stretching is multiple, i.e., the film length is continuously and steadily increased to achieve the final hot stretched film.

As mentioned above, a maximum annealing temperature is preferably determined from the incipient softening point, the temperature above which the crystalline structure of the film starts to deteriorate. Similarly, the maximum temperature of hot stretching is also preferably determined from the incipient softening point. Hence, it is only necessary that both the annealing temperature and the hot stretching temperature be less than the incipient softening point. In other words, the hot stretching temperature may be greater than the annealing temperature as long as both temperatures are less than the incipient softening point.

Following the hot stretching, the process of the instant invention optionally includes heat relaxing the cold stretched and hot stretched microporous film under tension such that the dimension of the film along the stretching axis may decrease, and at a temperature in the range of from above the temperature of the cold stretching step to a temperature less than or equal to the annealing temperature.

Important characteristics of this stretching scheme are that the permeability of the microporous film can be varied by controlling the total extension of the film, i.e., the length of the microporous film as compared to the length of the unstretched annealed precursor film, and that the permeability of the microporous film can be strongly influenced by controlling the rates of stretching during both the cold and hot stretching operations. As will be shown hereinafter, an increased cold stretching rate and a decreased hot stretching rate of the film lead to reduced Gurley values and hence correspondingly increased permeabilities of the films produced. As will also be shown hereinafter, the response of polyethylene films to variations in both the cold and hot stretching rates is wholly unexpected from the behavior of polypropylene films, which are virtually insensitive to variations in stretching rates. As will further be shown hereinafter, an increase in total extension during the hot and cold stretching also leads to a decrease in Gurley values and a corresponding increase in permeability within the ranges evaluated. However, it will also be shown hereinafter that permeability reaches a maximum or Gurley values a minimum where the total extension is about 140 percent.

In a preferred embodiment of the instant process, the annealed precursor film is cold stretched 20 to 60 percent at ambient temperature, hot stretched an additional 115 to 150 percent at a temperature less than or equal to the annealing temperature, and then allowed to relax under tension 40 to 50 percent at the same elevated temperature. All stretching and relaxation percentages are based on the length of the unstretched annealed precursor film, and the total extension percentages are based on the last step performed on the film, hence including a relaxing step if present. The relaxation or negative stretch imparts an improved dimensional stability to the microporous film produced, i.e., a reduced tendency to shrink during storage. The relaxation may be omitted if a higher tendency to shrink can be tolerated in conjunction with a particular end use of the microporous product. This embodiment produces a film having relatively large pores, a high void content, and good dimensional stability.

Alternatively and also a preferred embodiment of the instant process, the annealed precursor film is cold stretched as much as 100 percent at ambient temperature, hot stretched approximately an additional 40 percent at a temperature less than or equal to the annealing temperature, relaxed under tension 30 percent or less at the same elevated temperature, and heat set under tension at a constant length. The change in length during the relaxation may be zero percent, and is preferably from about 5 percent to about 10 percent. This heat set treatment may be carried out at a temperature in the range of from about 75° C. to the annealing temperature, and preferably at a temperature of from about 115° C. to 130° C. The period of the heat set should not be long at higher temperatures, and in general may be within the range of about 5 seconds to about 1 hour. The relaxation and heat set operations impart an improved dimensional stability to the microporous film product, i.e., a reduced tendency to shrink during storage. Either of these latter two operations may be omitted, but either or both of these latter two operations are necessary to stabilize products made with a large cold stretch. As the cold stretched length percentage is increased, it becomes more difficult to dimensionally stabilize the resultant film. This embodiment produces a microporous film having small pores, a high void content, and good dimensional stability.

The following Examples illustrate the process of the instant invention for producing microporous polyethylene films having improved permeability. In view of the fact that these examples are given for illustrative purposes only, they should not, in any way, be construed as limiting the invention thereto.

EXAMPLES I–IV

Crystalline polyethylene comprising at least 99% by weight ethylene and having a density of 0.960 gm./cm.$^3$, an inherent viscosity of 2.0, a crystalline melting point of about 135° C., and a melt flow rate of 0.85 is melt extruded at a temperature of 210° C. through a 12 inch diameter annular die having an opening of 0.070 inches. The hot tube thus formed is maintained at the die diameter by internal air pressure and quenched by an air stream impinging on the film from an air ring located around and above the die. The extruded film is drawn down at a drawdown ratio of 65 to 1 and is passed through a series of rollers to collapse the tube. The extruded precursor film is then oven annealed at a temperature of 115° C. After removal from the oven, the annealed precursor film is allowed to cool to ambient temperature. Thereafter, the annealed precursor film is cold stretched at an ambient temperature of 23° C. and hot stretched at 115° C. at varying rates for each stretching operation, at varying extensions for each stretching operation, and at varying total extensions. The incipient softening point of the polyethylene film is about 120° C. These conditions and Gurley determinations (ASTM test method D-726(B)), which are averaged from the two-ply films to yield the single-ply values shown below, are listed in Tables I–IV.

TABLE I

The annealed precursor as described above was cold stretched 30 percent and hot stretched an additional 81 percent to yield total extension of 111 percent at the stretching rates listed below and yielding the Gurley values listed below.

| Cold Stretching Rate (percent per minute) | Hot Stretching Rate (percent per minute) | Gurley Value (seconds) |
|---|---|---|
| 343 | 171 | 66 |
| 343 | 85 | 88 |
| 343 | 34 | 54 |
| 343 | 11 | 38 |
| 171 | 171 | 192 |
| 171 | 85 | 98 |
| 171 | 34 | 58 |
| 171 | 11 | 42 |
| 85 | 171 | 464 |
| 85 | 85 | 152 |
| 85 | 34 | 100 |
| 85 | 11 | 56 |
| 34 | 171 | 426 |
| 34 | 85 | 406 |
| 34 | 34 | 142 |
| 34 | 11 | 159 |

TABLE II

The annealed precursor as described above was cold stretched 40 percent and hot stretched an additional 86 percent to yield a total extension of 126 percent at the stretching rates listed below and yielding the Gurley values listed below.

| Cold Stretching Rate (percent per minute) | Hot Stretching Rate (percent per minute) | Gurley Value (seconds) |
|---|---|---|
| 343 | 171 | 62 |
| 343 | 85 | 49 |
| 343 | 34 | 49 |
| 343 | 11 | 36 |
| 171 | 171 | 102 |
| 171 | 85 | 68 |
| 171 | 34 | 49 |
| 171 | 11 | 36 |
| 85 | 171 | 123 |
| 85 | 85 | 90 |
| 85 | 34 | 59 |
| 85 | 11 | 40 |
| 34 | 171 | 238 |
| 34 | 85 | 180 |
| 34 | 34 | 94 |
| 34 | 11 | 75 |

TABLE III

The annealed precursor as described above was cold stretched 50 percent and hot stretched an additional 90 percent to yield a total extension of 140 percent at the stretching rates listed below and yielding the Gurley values listed below.

| Cold Stretching Rate (percent per minute) | Hot Stretching Rate (percent per minute) | Gurley Value (seconds) |
|---|---|---|
| 343 | 171 | 67 |
| 343 | 85 | 52 |
| 343 | 34 | 32 |
| 343 | 11 | 28 |
| 171 | 171 | 74 |
| 171 | 85 | 60 |
| 171 | 34 | 48 |
| 171 | 11 | 33 |
| 85 | 171 | 92 |
| 85 | 85 | 60 |
| 85 | 34 | 42 |
| 85 | 11 | 28 |
| 34 | 171 | 223 |
| 34 | 85 | 118 |
| 34 | 34 | 64 |
| 34 | 11 | 51 |

TABLE IV

The annealed precursor as described above was cold stretched 60 percent and hot stretched an additional 94 percent to yield a total extension of 154 percent at the stretching rates listed below and yielding the Gurley values listed below.

| Cold Stretching Rate (percent per minute) | Hot Stretching Rate (percent per minute) | Gurley Value (seconds) |
|---|---|---|
| 343 | 171 | 44 |
| 343 | 85 | 42 |
| 343 | 34 | 33 |
| 343 | 11 | 30 |
| 171 | 171 | 62 |
| 171 | 85 | 46 |
| 171 | 34 | 35 |
| 171 | 11 | 32 |
| 85 | 171 | 101 |
| 85 | 85 | 58 |
| 85 | 34 | 36 |
| 85 | 11 | 36 |
| 34 | 171 | 109 |
| 34 | 85 | 108 |
| 34 | 34 | 82 |
| 34 | 11 | 44 |

The results of these experiments are also shown in FIGS. 1–4, corresponding to the results in Tables I–IV, respectively. FIGS. 1–4 show that the Gurley value decreases, and therefore permeability increases, as the total extension, i.e., cold extension plus hot extension, increases. A comparison of FIGS. 3 and 4 indicates the apparent approach of a minimum Gurley value. The significant influence of the stretching rates should be appreciated with respect to each of FIGS. 1–4, as an increased cold stretching rate and a decreased hot stretching rate lead to reduced Gurley values and improved permeabilities. This response of polyethylene film to variations in stretching rates is unexpected in view of the behavior of polypropylene films to variations in stretching rates, as shown in the next example.

COMPARATIVE EXAMPLE

A polypropylene homopolymer resin having a density of 0.90 gm./cm.$^3$, an inherent viscosity of 3.08, a crystalline melting point of about 165° C., and a melt flow rate of 0.60 was blown film extruded to yield a two-ply film. The extruded two-ply film was annealed at a temperature of 140° C. for 20 minutes. The resultant two-ply annealed polypropylene film was cold stretched 20 percent at an ambient temperature of 23° C. and subsequently hot stretched an additional 80 percent at a temperature of 144° C. The incipient softening point of the polypropylene film is about 150° C. The cold stretching and hot stretching rates were varied to obtain Gurley second values for single plies as averaged from two-ply determinations and are listed in Table A.

TABLE A

| Stretching Rates (percent per minute) | | Gurley Values |
| --- | --- | --- |
| Cold | Hot | (seconds) |
| 343 | 343 | 27.8 |
| 343 | 171 | 29.2 |
| 343 | 85 | 28.8 |
| 343 | 34 | 30.9 |
| 171 | 343 | 34.1 |
| 171 | 171 | 28.2 |
| 171 | 85 | 30.8 |
| 171 | 34 | 29.0 |
| 85 | 343 | 36.8 |
| 85 | 171 | 27.6 |
| 85 | 85 | 29.2 |
| 85 | 34 | 27.8 |
| 34 | 343 | 36.8 |
| 34 | 171 | 40.4 |
| 34 | 85 | 29.6 |
| 34 | 34 | 23.6 |

Figure 5:
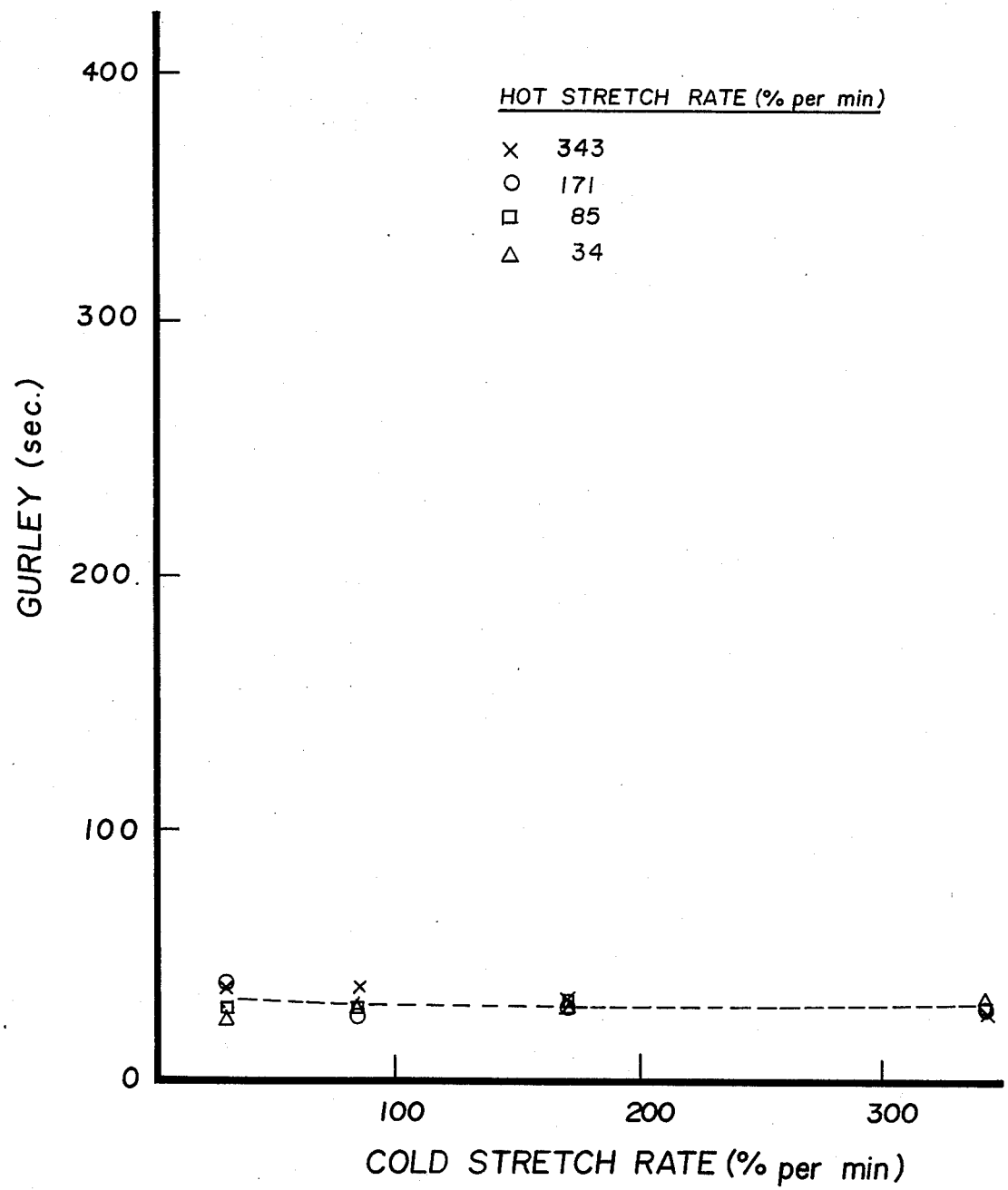
FIG. 5 is a graphic depiction of the effect of the instant invention on film permeability for polypropylene film.

The results of Table A are shown in FIG. 5. A comparison of the results of the present invention using polyethylene films, as shown in FIGS. 1–4, and the results of the process of the present invention when using polypropylene film, as shown in FIG. 5, clearly shows that it is virtually impossible to distinguish the effect of changes in stretching rate on the film permeability when polypropylene films are used.

EXAMPLES V–XIV

Following the same procedure as in Examples I–IV, an annealed precursor film is prepared. The annealed and cooled precursor film is cold stretched 90 percent at a rate of 381 percent per minute and at a temperature of 23° C., hot stretched an additional 40 percent at a rate of 105 percent per minute and at a temperature of 115° C., heat relaxed at varying rates at a temperature of 115° C., and heat set at constant length at the same temperature. The Gurley values of the film produced were then determined. This stretching and relaxing scheme was performed on films of three different thicknesses. The results of these experiments are summarized in Table V.

TABLE V

| Hot Relax | | Film Thicknesses and Gurley Values (seconds) | | |
| --- | --- | --- | --- | --- |
| (percent) | (percent per minute) | 1.10 mil. | 0.89 mil | 0.74 mil |
| 0 | 0 | 91 | 40 | 18 |
| 10 | 14 | 164 | 44 | 21 |
| 20 | 28 | 234 | 45 | 22 |

EXAMPLES XV–XXIV

The same general procedure as in the immediately proceeding examples was followed with the following changes: the film was cold stretched 100 percent at a stretching rate of 439 percent per minute, and the hot stretching rate was 110 percent per minute. These results are summarized in Table VI.

TABLE VI

| Hot Relax | | Film Thicknesses and Gurley Values (seconds) | | |
| --- | --- | --- | --- | --- |
| (percent) | (percent per minute) | 1.10 mil. | 0.89 mil | 0.74 mil |
| 0 | 0 | 122 | 34 | 16 |
| 10 | 15 | 145 | 32 | 18 |
| 20 | 29 | 162 | 46 | 21 |
| 30 | 42 | 151 | 55 | 23 |

A comparison of the above Tables V and VI reveals the effect of the heat relaxing length change on the resultant permeabilities of the films. As the change in length and the rate of change of length during hot relaxing increases, there is a corresponding increase in Gurley values and hence a reduction in permeability. In essence, as the film is allowed to undergo an increasing negative stretch during the relaxing step, the void size of the film decreases and hence there is more resistance to mass transfer across the film. (It is to be remembered that the greater the permeability, the lower the Gurley second values obtained.) Tables V and VI also reveal that permeability increases as the starting film thickness is decreased, and in the preferred embodiments of the instant invention, it is preferred that the extruded precursor film thickness be less than or equal to 0.89 mil.

The thickness of the polyethylene film in the foregoing example is not critical. However, equipment capabilities to keep the film flat and crease free will limit the minimum thickness and thicker films will have higher Gurley values due to the increased intrasurface distance. It is preferred that the film thickness be from about 0.2 mil to about 2.0 mil.

The process of the present invention provides membranes which have better permeabilities than those produced by similar processes. For example, U.S. Pat. No. 3,679,538 discloses a process for producing a microporous polymer film by the consecutive steps of cold stretching, hot stretching and heat setting. The films therein, as exemplified by the claims, have permeabilities measured by nitrogen flux Q (gm.-mole $N_2$/cm.$^2$-min. $\times 10^3$ at a differential pressure of 200 p.s.i.) of from 50–200. Using the empirical formula $GQ \approx 2000$, wherein Q is nitrogen flux as defined above and G is Gurley flux in seconds as previously defined, the permeability of the films in the patent range from 40 to 10 Gurley seconds.

EXAMPLE XXV

To illustrate the advantages of the present invention, such as with respect to example eleven of the aforementioned patent, the following procedure was followed. A polyethylene resin having a density of 0.960 gm./cm.³, a melt index of 0.49 gm./10 min. and an inherent viscosity of 1.9 dl./gm. was extruded at 185° C. through a 12 inch blown film die having a gap of 0.070 inches. The resulting hot tube was drawn down at a ratio of 137:1 to produce the extruded precursor film. Subsequently, the extruded film was annealed under tension at 115° C. for 19 minutes to perfect the crystalline structure. After cooling to ambient temperature, the unstretched annealed precursor film was cold stretched 40 percent at a rate of 212 percent per minute, hot stretched at 103° C. an additional 129 percent at a rate of 22 percent per minute and relaxed at the same elevated temperature by 43 percent at a rate of 11 percent per minute. The microporous polyethylene film thus produced was cooled and the measured Gurley value was found to be 6 seconds, as opposed to the 40-10 seconds in the abovementioned patent. The resultant film possessed a bulk density of 48 percent with respect to the corresponding polyethylene film having no open-celled structure. It is thus seen that microporous polyethylene films produced by the process of the present invention have greatly improved permeabilities with respect to microporous films produced by other processes.

The present invention may be carried out in a batch processing manner. Alternatively, and in a more preferred manner consistent with the economic implementation of the present invention, the present process for obtaining a microporous polyethylene product can be achieved by performing the process in a continuous manner.

The films of the present invention are useful as separators in lithium-manganese dioxide batteries and in chemical packaging for use as a vent.

The invention which is intended to be protected herein is not to be construed as limited to the particular forms disclosed; the above preferred embodiments and examples are given to illustrate the spirit of the instant invention. Other embodiments and examples within the scope and spirit of the present invention are also within the contemplation of this invention, and variations and changes may be made by those skilled in the art without departing from the spirit of the present invention.

What is claimed is:

1. A process for producing a microporous polyethylene film, comprising:
   (a) melt extruding at a drawdown ratio of about 20:1 to about 200:1 a polyethylene resin having a density of at least approximately 0.960 gm./cm.³ and having at least 99% by weight ethylene to form an extruded precursor film;
   (b) annealing said extruded precursor film at a temperature in the range of from about 10° C. to about 25° C. less than the crystalline melting point of said resin so as to improve the crystallinity of the extruded precursor film and so as to form an unstretched annealed precursor film;
   (c) uniaxially cold stretching said annealed precursor film at a temperature in the range of from about −20° C. to about 70° C., and at a cold stretching rate of at least 75 percent per minute, based on the length of the unstretched annealed precursor film, to achieve a cold stretched length of from about 120 percent to about 160 percent, said cold stretched length being based on the length of said unstretched annealed precursor film, to form a cold stretched precursor film;
   (d) hot stretching said cold stretched precursor film, in the same uniaxial direction as said cold stretching, at a temperature in the range of from above the temperature in (c) to a temperature in the range of from about 10° C. to about 25° C. less than the crystalline melting point of the resin so as to maintain the crystallinity of the cold stretched precursor film, and at a hot stretching rate of less than 75 percent per minute, based on the length of said unstretched annealed precursor film, to achieve a hot stretched length of from about 235 percent to about 310 percent, said hot stretched length being based on the length of said unstretched annealed precursor film, so as to form a microporous polyethylene film.

2. The process as defined in claim 1 wherein the microporous polyethylene film is allowed to relax, in the same uniaxial direction as said cold stretching and said hot stretching, from about 40 percent to about 50 percent, based on the length of said annealed precursor film, at a temperature in the range of above the temperature in (c) to at or below the temperature in (b).

3. The process as defined in claim 1 wherein said cold stretching rate is at least 100 percent per minute.

4. The process as defined by claim 1 wherein said hot stretching rate is less than 34 percent per minute.

5. The process as defined by claim 1 wherein the sum of said cold stretched length and said hot stretched length is at least 140 percent based on the length of the unstretched annealed precursor film.

6. The process as defined by claim 1 wherein the melt extrusion is performed through an annular die.

7. The process as defined by claim 1 wherein the cold stretching rate is at least 170 percent per minute and the cold stretched length is at least 50 percent.

8. The process as defined by claim 1 wherein the hot stretching rate is less than 30 percent per minute and the hot stretched length is at least 90 percent.

9. The process as defined by claim 1 wherein the hot stretched length is greater than the cold stretched length.

10. A process for producing a microporous polyethylene film, comprising:
   (a) melt extruding at a drawdown ratio of about 20:1 to about 200:1 a polyethylene resin having a density of at least approximately 0.960 gm./cm.³ and having at least 99% by weight ethylene to form an extruded precursor film;
   (b) annealing said extruded film at a temperature in the range of from about 10° C. to about 25° C. less than the crystalline melting point of the resin so as to improve the crystallinity of the extruded precursor film and so as to form an unstretched annealed precursor film;
   (c) uniaxially cold stretching said annealed precursor film at a temperature in the range of from about −20° C. to about 70° C. at a cold stretching rate of between about 380 percent per minute and about 440 percent per minute, based on the length of said annealed precursor film, to achieve a cold stretched length of between about 190 percent and 200 percent, said cold stretched length being based on the length of said annealed precursor film, to form a cold stretched precursor film;
   (d) hot stretching said cold stretched precursor film, in the same uniaxial direction as said cold stretching, at a temperature in the range of from above the temperature in (c) to a temperature in the range of from about 10° C. to about 25° C. less than the crystalline melting point of the resin so as to maintain the crystallinity of the cold stretched precursor film at a hot stretching rate of about 105 percent per minute, based on the length of the annealed precursor film, to achieve a hot stretched length of about 240 percent, said hot stretched length being based on the length of said annealed precursor film, to form a hot stretched precursor film; and (e) heat relaxing said hot stretched precursor film under tension at a temperature in the range of from above the temperature in (c) to less than or equal to the temperature in (b) so as to maintain the crystallinity of the hot stretched precursor film to achieve a decrease in length of said hot stretched precursor film, in the same uniaxial direction as said cold stretching, of between 0 percent and about 30 percent, said decrease in length being based on the length of said annealed precursor film, so as to form a microporous polyethylene film.

11. The process as defined by claim 10 wherein during (e) the decrease in length is zero percent.

12. The process as defined by claim 10 wherein during (e) the decrease in length is between about 5 percent and about 10 percent.

13. The process as defined by claim 10 further comprising heat setting the heat relaxed film under tension at constant length at a temperature in the range of above the temperature in (c) to less than or equal to the temperature in (b).

14. The process as defined by claim 10 wherein the duration of (b) is about 20 minutes.

15. The process as defined by claim 10 wherein the thickness of the film in (a) is less than or equal to 89 mil.

16. The process as defined by claim 13 further comprising heat relaxing the film heat relaxed at constant length to achieve a decrease in length of less than 30 percent based on the length of said unstretched annealed precursor film.

17. The process as defined by claim 10 wherein the melt extrusion is performed through an annular die.

18. The process as defined by claims 1 or 10 wherein the thickness of the film in (a) is from about 0.2 mil to about 2.0 mil.

* * * * *